United States Patent Office 3,734,952
Patented May 22, 1973

3,734,952
PREPARATION OF L-DOPA
Alan Martin Krubiner, Montville, N.J., assignor to
Hoffmann-La Roche Inc., Nutley, N.J.
No Drawing. Filed Dec. 27, 1968, Ser. No. 787,563
Int. Cl. C07c 101/08
U.S. Cl. 260—501.11                       5 Claims

ABSTRACT OF THE DISCLOSURE

The present invention relates to a process for the preparation of L-dopa and to an aryl lower alkylamine resolving agent usable in this preparation.

DETAILED DESCRIPTION OF THE INVENTION

Dopa (chemically, 3,4-dihydroxyphenylalanine) has been known for many years to be an intermediate in the biological pathway from tyrosine to epinephrine. Quite recently, L-dopa, the L-enantiomorph of the racemate dopa, has been found to be a remarkably effective therapeutic agent in the treatment of Parkinson's Disease. Until this finding, sufferers of Parkinson's Disease relied only upon hit or miss symptomatic drug therapy or on surgical procedures in the hope of relief from the effects of their affliction. Unfortunately, neither symptomatic drug therapy nor surgical procedures generally resulted in more than a temporary retardation from the effects of this serious malady. The art has long recognized the pressing need for a medicament which would serve to control this chronic disease. The recent finding that L-dopa is effective in the treatment of Parkinson's Disease has buoyed the hope of many. However, good quality L-dopa is not available except in the most minor of amounts because quality L-dopa is difficult to prepare by prior art techniques. Because of the paucity of good quality L-dopa, even those in the most pressing need have had difficulty obtaining it. It is evident that the supply of L-dopa must be dramatically increased.

The object of the present invention is to provide ample amounts of good quality L-dopa. This end has been achieved in the novel combination of process steps described hereinafter which involve a particularly efficacious resolving agent.

The invention therefore as is quite evident from the above, relates to processes and intermediates for the preparation of L-dopa. More specifically it relates to the conversion of known D,L - 3,4 - disubstituted phenylalanines into L-dopa without forming the unwanted D-dopa. Still more specifically, it relates to key intermediates for the above synthesis, namely, the α-lower alkyl aryl methyl amine salt of N-acyl-3,4-disubstituted phenylalanines, to processes for preparing such compounds, to processes for converting them into L-dopa and novel intermediates formed in such conversions.

To obtain L-dopa in accordance with one process aspect of the present invention, a racemate of the formula

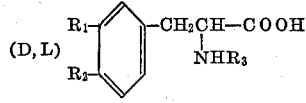

I wherein $R_1$ and $R_2$ are, individually, selected from the group consisting of hydroxy, lower alkoxy, acyloxy and phenyl lower alkoxy and, when taken together represent lower alkylenedioxy and $R_3$ is an acyl group is treated with a suitable optically active resolving agent of the formula

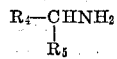

II wherein $R_4$ is selected from the group consisting of phenyl, naphthyl and substituted derivatives thereof (e.g. halophenyl [o.m.p.] or tolyl) and $R_5$ is lower alkyl to thereby yield a salt of the formula

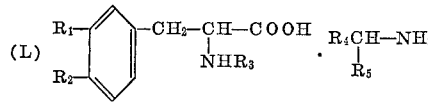

III wherein $R_1$, $R_2$, $R_3$, $R_4$ and $R_5$ are as above.

In compounds of the Formula I above, $R_3$ preferentially represents benzoyl, substituted benzoyl, e.g. p-halobenzoyl or a lower alkanoyl radical such as acetyl, propionyl, butyryl and the like. Most preferred as $R_3$ for the purposes of the present invention is a lower alkanoyl group, most advantageously, acetyl, or the group benzoyl. Also preferred is a compound of the Formula I wherein $R_1$ and $R_2$ are lower alkoxy, most suitably, methoxy or together lower alkylenedioxy, most suitably, methylenedioxy or a compound of the Formula I above wherein one of $R_1$ and $R_2$ is lower alkoxy, e.g. methoxy and the other is hydroxy, most preferably, a 3-methoxy-4-hydroxy compound. Particularly preferred compounds utilizable are N-benzoyl-3(4-hydroxy-3-methoxyphenyl)-alanine and N-acetyl-3,4-dimethoxyphenylalanine.

In Formula II, preferred are those compounds wherein $R_4$ is phenyl and $R_5$ is methyl, i.e. (+)-α-methylbenzylamine. Other resolving agents can be represented by compounds wherein $R_4$ is naphthyl, e.g. (+)-α-(1-naphthyl)-ethylamine.

In the preparation of the salt of the Formula III via the treatment of a compound of the Formula I with a compound of the Formula II, there is utilized such molar amounts of the substances of the Formulas I and II above as to provide a saturated solution of the desired (L)-enantiomorph. The saturated solution is then preferably contacted with a small amount of the same (L)-enantiomorph of the Formula III above which is obtained in the treatment of I with II above in finely-divided crystalline form to form a supersaturated solution. After cooling, the (L)-crystalline enantiomorph is recovered in high yields from the mother liquors by filtration. In the treatment step, it is preferred that there be utilized for every one mole of a racemate of the Formula I, from about 0.40 to about 1.5 moles of the resolving agent of the Formula II; more preferably from about 0.40 to about 1.00 mole; most preferably, 0.40 to about 0.60 mole.

A solvent in which supersaturation occurs may be preferably represented by a lower alkyl ketone such as acetone, methylethyl ketone, methyl isobutyl ketone and the like. Other usable solvents include dioxane and formamide and mixtures of all of these.

It should be understood that the supersaturated solution can be prepared by cooling the saturated solution formed to effect crystallization and then increasing the amount of crystallization by then seeding with the appropriate compound of the Formula III. The seeding is not essential. However, its use is preferred in order to increase the yield of the desired enantiomorph.

The choice of solvent for this process step is determined by the solubility characteristics of the racemic mixture being separated. Hence, the most efficacious inert organic solvents in this step are readily ascertainable by those of ordinary skill in the art. However, it is preferred to utilize a relatively inexpensive organic solvent such as the said lower alkyl ketone, preferentially, acetone.

This process step is a particularly salient one in that it provides a salt of the Formula III above which is easily separable in high purity from the reacting mixture in which it is formed. This capability of the said salt of the Formula III to be easily separated without repeated and/ or involved complicated crystallization procedures is surprising.

The resulting (L) salt of the Formula III above is then neutralized with a base or an acid by conventional procedures to a compound of the formula

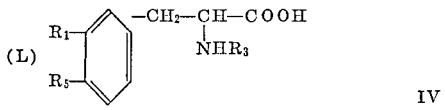

wherein $R_1$, $R_2$ and $R_3$ are as above.

Any base capable of effecting the neutralizing step is suitable for the purposes of the present invention. However, a preferred base is an alkali metal hydroxide, e.g. sodium hydroxide, sodium carbonate, etc. Certain of the enantiomorphs of the Formula IV above are novel, e.g. L-N-acetyl-3,4-dimethoxyphenylalanine. A suitable neutralizing acid is a mineral acid, e.g. HBr, HCl, etc.

To obtain L-dopa, a compound of the Formula IV above is treated with an agent capable of effecting deacylation, e.g. an aqueous hydrohalogenic acid such as aqueous hydrochloric acid, aqueous hydrobromic acid and the like. The deacylation is effected preferentially at elevated temperatures, e.g. at about reflux temperature, in accordance with prior art procedures. As is noted above, this treatment results in L-dopa which is chemically

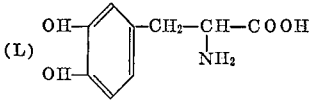

The deacylation agent (such as aqueous hydrochloric acid) is preferentially selected so that if $R_1$ and/or $R_2$ are other than hydroxy, there will result the corresponding 3,4-dihydroxy compound. By this convenient approach, a dual purpose is served, e.g. both the conversion to the dihydroxy group and the concurrent deacylation whereby removal of the $R_3$ group is effected. Of course, it is to be understood that conditions can be controlled in accordance with prior art procedures so that when $R_1$ and/or $R_2$ contain an alkoxy, phenyl alkoxy or alkylenedioxy group and $R_3$ is lower alkanoyl, the deacylation can be first effected and the dealkylation subsequently effected. It is preferred to effect, of course, removal of both the acyl group and the alkyl group in a single step.

The D-enantiomorph of the compound of the Formula IV above remains in solution after separation of the corresponding L-enantiomorph. It can be separated from the mother liquors by conventional procedures, e.g. solvent removal or extraction. Treatment of the free acid so obtained with acetic anhydride in the presence of base results in the racemate of the Formula I above. Thus, the D-enantiomorph recovered by this method is recycled and converted to the racemic compound of the Formula I. From a commercial point of view, this is important since it avoids the accumulation of an unusable D-enantiomorph.

Another process aspect involves the over-all synthesis of L-dopa. The over-all process involves several steps.

In the first step, a compound of the formula

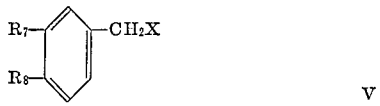

wherein $R_7$ and $R_8$ are lower alkoxy and when taken together, represent lower alkylenedioxy and X is any suitable leaving group capable of functioning efficaciously for the purposes of the present invention is reacted with a compound of the formula

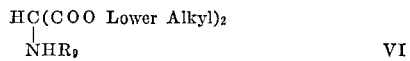

wherein $R_9$ represents a lower alkanoyl group, most preferably, acetyl.

In the first step, the reaction is preferentially effected in the presence of an inert organic solvent such as dimethylformamide or an ether such as tetrahydrofuran, dimethylsulfoxide, a lower alkanol such as ethanol, methanol and the like. While temperature is not a critical aspect of this process step, it is preferred to conduct the reaction at a temperature range of from about 20° to about the reflux temperature of the reaction medium, most preferably at a temperature range of from about 30° to about 70° C. The temperature selected is determined in part by the desire to keep the ensuing reaction from becoming too vigorous. The choice of temperature is well within the skill of the artisan.

It is preferred to carry out the first step in the presence of a strong base, preferentially, in about an equivalent amount. Bases which will function efficaciously for this purpose are alkali metal hydrides such as lithium hydride, sodium hydride and the like. Alkali metal alkoxides, such as, sodium methoxide and sodium ethoxide can also be utilized.

As is indicated above, any leaving group X which will function efficaciously for the purposes of the present invention is included within the purview thereof. In the most advantageous aspect, bromine and chlorine is present as the group X and, thus, X is advantageously selected from the group halogen, most preferentially, middle halogen (bromine and chlorine). However such leaving groups as lower alkylsulfonyloxy, e.g. mesyl, aryl sulfonyloxy, e.g. benzene sulfonyl or tosyl or lower alkanoyloxy, e.g. acetoxy, can also be utilized as the leaving group.

In the most preferred aspect, in the first step veratryl chloride (dimethoxy benzylchloride) is reacted with a di-lower alkyl lower alkanoylamidomalonate, most preferentially, diethylacetamidomalonate.

The first step of this process aspect results in a compound of the formula

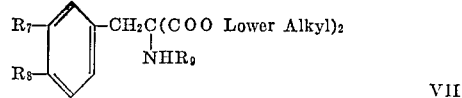

wherein $R_7$, $R_8$ and $R_9$ have the same meaning as ascribed thereto hereinabove.

The resulting compound of the Formula VII is subjected to a hydrolysis technique, preferably with about two equivalents of a weak base and the resulting substance is decarboxylated with a mineral acid to thereby obtain a racemate of the Formula I above wherein $R_1$ and $R_2$ therein is individually lower alkoxy, and together, methylene dioxy and $R_3$ the acyl moiety, lower alkanoyl, i.e. a compound of the formula

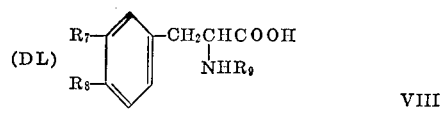

wherein $R_7$, $R_8$ and $R_9$ are as above.

The hydrolysis and decarboxylation of a compound of the Formula VII is suitably effected without isolating the intermediate prepared from the hydrolyzing step.

A suitable base utilizable in the conversion of a compound of the Formula VII into the corresponding racemate of the Formula VIII is preferably an alkali metal hydroxide, carbonate, or bicarbonate. Preferred is sodium hydroxide. Other weak bases can be represented by sodium carbonate, sodium bicarbonate, potassium hydroxide and the like. Acids utilizable in the decarboxylation step as illustrated by a mineral acid such as hydrohalic acid (e.g. HCl, HBr) sulfuric acid, nitric acid and the like. In the decarboxylation step, the pH of the reaction medium should be maintained in the range of from about 3 to about 7. Suitably, the said hydrolysis and decarboxylation, in a preferred aspect, is effected at an elevated temperature, preferably at about the reflux temperature of the reaction medium. The choice of solvent in this step is not critical.

The process aspect of the present invention is particularly noteworthy in that it results in the hydrolysis and subsequent decarboxylation of a compound of the Formula VII, while leaving the acyl moiety, e.g. the lower alkanoyl moiety on the amino nitrogen atom, uneffected.

The term "lower alkyl" as utilized herein alone or in combination represents a straight or branched chain hydrocarbon group containing 1–7, preferably 1–4 carbon atoms such as methyl, ethyl, butyl and the like. By the term "lower alkoxy" used alone or in combination herein, a straight or branched chain hydrocarbonoxy group containing 1–7, preferably 1–4 carbon atoms, is intended such as methoxy, ethoxy and the like. The term "lower alkylenedioxy" represents a group containing 1–7, preferably 1–4, carbon atoms such as methylenedioxy, ethylenedioxy and the like. "Halo" or "halogen" as utilized herein contemplates all four forms thereof, chlorine, bromine, iodine or fluorine, unless otherwise specified.

The expression, acyloxy, as utilized herein, represents a group such as benzoyloxy, lower alkanoyloxy, e.g. acetoxy propionyloxy and the like. The group phenyl lower alkoxy can be represented by phenylmethoxy and phenylethoxy.

One process aspect of the present invention over-all involves the saponification and decarboxylation of diethylacetamido - (3,4-dimethoxybenzyl)malonate to N-acetyl-3,4-dimethoxyphenylalanine. The last-mentioned compound is treated in the manner described above with (+)-α-methyl-benzylamine to obtain the novel (L)-N-acetyl - 3,4 - dimethoxyphenylalanine·(+)-α-methylbenzylamine. Upon neutralization with sodium hydroxide, the novel (L)-N-acetyl-3,4-dimethoxyphenylalanine is obtained. Heating this material, preferably at reflux in the presence of aqueous mineral acid, such as aqueous hydrobromic acid, yields L-dopa.

It is understood that the following examples are representative and not limitative of the foregoing invention. All temperatures stated are in degrees centigrade.

EXAMPLE 1

12.0 g. (0.275 mole) of a 55 percent sodium hydride dispersion in mineral oil was washed 3 times with petroleum ether and blown dry with nitrogen. 75 ml. of dry dimethylformamide was added and the slurry was stirred under nitrogen while a solution of 58.0 g. (0.268 mole) of diethylacetamidomalonate in 150 ml. of dry DMF was slowly added. The rate of addition was controlled so as to keep the internal temperature below 40° and the hydrogen evolution from becoming too vigorous. When the addition was completed all of the material was in solution (slightly cloudy). After cooling to room temperature, 72.9 g. of veratryl chloride was added in one portion and rinsed in with 45 ml. of dry DMF. The temperature slowly rose to 40°, then returned to ambient. The reaction was stirred at room temperature overnight, neutralized by the addition of ethanolic HCl, and the solvent was removed under high vacuum. The residue was partitioned between 500 ml. each of methylene chloride and water, and the aqueous phase was extracted 2 additional times with 500 ml. portions of methylene chloride. The combined organic extracts were washed with water, dried with sodium sulfate and the solvent was evaporated in vacuo. The crude yellow oil was crystallized from about 250 ml. of ether at −5° to afford three crops of diethylacetamido(3,4-dimethoxybenzyl)malonate. The product in the first crop had a M.P. of 99–100.5°. The product in the second crop had a M.P. of 93–100°. The second crop was recrystallized from ether to afford a third crop, M.P. 103–104.5°.

EXAMPLE 2

A mixture of 20.0 g. (0.0545 mole) of diethylacetamido-(3,4 - dimethoxybenzyl) - malonate and 4.85 g. (0.121 mole) of sodium hydroxide in 240 ml. of water was stirred and heated to reflux under nitrogen. In a few minutes the solid material completely dissolved and the heating was continued for a total of 1 hr. After cooling to room temperature, the pH was adjusted to 3 (pH meter) with conc. HCl. When the carbon dioxide evolution subsided the mixture was heated to reflux for 0.5 hr. and then concentrated to a volume of about 100 ml. in vacuo. The residue was cooled to room temperature, the pH adjusted to 1 with conc. HCl and 500 ml. of saturated brine was added. The turbid aqueous phase was extracted 3 times with methylene chloride which was dried with sodium sulfate and concentrated in vacuo to constant weight.

The resulting light tan foam first crop: 13.6 g., (93.5 percent yield) was essentially pure as determined by the nmr spectrum and was D,L - N - acetyl-3,4-dimethoxyphenylalanine.

EXAMPLE 3

A warm solution of 7.65 g. (0.0286 mole) of D,L-N-acetyl-3,4-dimethoxyphenylalanine in 100 ml. of acetone was treated with a solution of 1.73 g. (0.0143 mole) of (+)-α-methylbenzylamine in 10 ml. of acetone. If the salt precipitates it is brought into solution by the addition of a small amount of methanol. After removal of the methanol by concentrating the solution (on the steambath) to 75 ml. and adding acetone back to 100 ml. (3 times) the volume was adjusted at about 100 ml. The solution was seeded with crystals of pure (L)-N-acetyl-3,4 - dimethoxyphenylalanine, (+)-α-methylbenzylamine and allowed to cool to room temperature. After standing at room temperature overnight the crystals were filtered and washed with cold acetone and with ether and dried yielding (L)-N-acetyl-3,4-dimethoxyphenylalanine. (+)-α-methylbenzylamine as white crystals, M.P. 186–188°, $[\alpha]_D^{25} + 56.0°$ (c.=1. MeOH)$^5$.

EXAMPLE 4

5.0 g. (0.0129 mole) of (L)-N-acetyl-3,4-dimethoxyphenylalanine (+)-α-methylbenzylamine was dissolved in 30 ml. of 5 percent sodium hydroxide solution and extracted 3 times with petroleum ether to remove liberated (+)-α-methylbenzylamine. The aqueous phase was adjusted to pH 1 with conc. HCl, 150 ml. of saturated brine was added and it was extracted 3 times with ethyl acetate. After the organic phase was dried with sodium sulfate, the solvent was removed in vacuo to afford (L)-N-acetyl-3,4-dimethoxyphenylalanine which crystallized upon standing $[\alpha]_D^{25} + 46°$ (c.=1, MeOH). This material was heated at reflux for 2 hr. with 35 ml. of 48 percent HBr and then concentrated to dryness in vacuo. The residue was dissolved in 25 ml. of water and extracted twice with ether. The aqueous phase was then treated with 10 ml. of acetonitrile followed by 5 ml. of propylene oxide. In a few minutes, a fine crystalline precipitate formed. The mixture was treated with 80 ml. of acetonitrile and after standing overnight at +2° (final pH 4.5), was filtered and the solid washed with water-acetonitrile (1:5), acetonitrile, ether and then dried to afford L-(−)-dopa, $[\alpha]_D^{25}$ −11.3° (c.=1, 1 N HCl), M.P. 300° dec.

EXAMPLE 5

5.0 g. of DL-N-benzoyl-3-(4-hydroxy-3-methoxy-phenylalanine was dissolved in 100 ml. of acetone, was heated to reflux and treated with 0.97 g. (½ equiv.) of (+)-α-methylbenzylamine. The solution was seeded with a few crystals of L-N-benzoyl-3-(4-hydroxy-3-methoxy)phenylalanine·α-methylbenzylamine and allowed to cool to room temperature. The precipitate was filtered off and recrystallized from acetone to afford L-N-benzoyl-3(4-hydroxy - 3-methoxy)-phenylalanine·α-methylbenzylamine, M.P. 181–184° $[\alpha]_D^{25} + 57.6°$ (c.=1, MeOH).

EXAMPLE 6

3.0 g. of (L)-N-benzoyl-3-(4-hydroxy-3-methoxy)-phenylalanine·(+)-α-methylbenzylamine was dissolved in 30 ml. of 5 percent sodium hydroxide solution and 10 ml. methanol and extracted three times with benzene to remove the liberated (+)-α-methylbenzylamine. The aqueous phase was adjusted to pH 2 with conc. HCl and the resulting solution extracted three times with ethyl acetate. After the organic phase was dried with sodium sulfate, the solvent was removed in vacuo to afford (L)-N-benzoyl-3(4-hydroxy - 3 - methoxy)-phenylalanine which crystallized upon standing. This material was heated at reflux for 2 hours with 20 ml. of 48 percent HBr and then concentrated to dryness in vacuo. The residue was dissolved in 25 ml. of water and extracted twice with ether. The aqueous phase was then treated with 10 ml. of acetonitrile followed by 5 ml. of propylene oxide. In a few minutes a fine crystalline precipitate formed. The mixture was treated with 80 ml. of acetonitrile and after standing overnight at −2° (final pH 4.5), was filtered and the solid washed with water, acetonitrile (1:5), acetonitrile/ether and then dried to afford L-(−)-dopa.

EXAMPLE 7

A mixture of 2.0 g. of D,L-N-benzoyl-3,4-dimethoxyphenylalanine and 0.368 g. of (+)-α-methylbenzylamine in 20 ml. of refluxing acetone was treated with a few seed crystals of the resulting salt and allowed to cool to room temperature. The (L)-N-benzoyl-3,4-dimethoxyphenyl-alanine·(+)-α-methylbenzylamine salt was filtered off and washed with acetone.

In the manner described in Example 4, the above salt (5.0 g.) was decomposed to L-N-benzoyl-3,4-dimethoxyphenylalanine and then converted to L-dopa by refluxing with 48 percent HBr, also as in Example 4.

EXAMPLE 8

10 g. of D,L-N-benzoyl-3(4-hydroxy-3-methoxyphenyl)-alanine was dissolved in a solution of 2.56 g. of NaOH is 50 ml. of $H_2O$. 3.1 ml. of acetic anhydride was added rapidly with stirring. After 15 minutes, the mixture was acidified and extracted with ethyl acetate. The so-obtained D,L-N-benzoyl - 3-(4-acetoxy-3-methoxyphenyl)-alanine was recrystallized from methylenechloride-ether and had a M.P. of 138–141°.

EXAMPLE 9

A solution of 4.0 g. of D,L-N-benzoyl-3-(4-acetoxy-3-methoxyphenyl)-alanine and 0.68 g. of (+)-α-methylbenzylamine in 35 ml. of refluxing acetone was treated with a few seed crystals of the desired L-salt and allowed to cool to room temperature. The precipitated L-N-benzoyl - 3 - (4-acetoxy-3-methoxyphenyl)-alanine·(+)-α-methylbenzylamine salt was filtered and washed with acetone.

As in Example 4, L-N-benzoyl-3-(4-acetoxy-3-methoxyphenyl)-alanine·(+)-α-methylbenzylamine was converted to L-N-benzoyl-3-(4-acetoxy-3-methoxyphenyl)-alanine and the latter was converted to L-(−)-dopa by refluxing with 48 percent HBr.

EXAMPLE 10

A mixture of 2.5 g. of D,L-N-benzoyl-3-(3-hydroxy-4-methoxyphenyl)-alanine and 0.485 g. (+)-α-methylbenzylamine in 20 ml. of refluxing acetone was treated with a few seeds of the resulting L-salt and allowed to cool while stirring to room temperature. The precipitate was filtered off to afford L-N-benzoyl-3(3-hydroxy-4-methoxyphenyl)-alanine·(+)-α-methylbenzylamine salt.

As in Example 4, L-N-benzoyl-3-(3-hydroxy-4-methoxyphenyl)-alanine·(+)-α-methylbenzylamine was converted to L-N-benzoyl-3-(3-hydroxy-4-methoxyphenyl) - alanine which in turn was converted to L-dopa.

EXAMPLE 11

A solution of 5 g. of D,L-N-benzoyl-3-(3-hydroxy-4-methoxyphenyl)-alanine in 26 ml. of 5 percent of NaOH solution was stirred rapidly and treated with 1.55 ml. of acetic anhydride. The resulting mixture was stirred for 10 minutes. After acidification, D,L-N-benzoyl-3-(3-acetoxy-4-methoxyphenyl)-alanine was isolated with ethyl acetate and was recrystallized from methylenechloride-ether.

EXAMPLE 12

2.0 g. of D,L-N-benzoyl-3-(3-acetoxy-4-methoxyphenyl)-alanine was dissolved in 25 ml. of refluxing acetone and treated with 0.34 g. of (+)-α-methylbenzylamine. After seeding with the desired L-salt, the mixture was allowed to cool to room temperature and the precipitated L-N-benzoyl-(3-acetoxy-4-methoxyphenyl) - alanine·(+) - α-methylbenzylamine salt was filtered and washed with acetone.

L-N-benzoyl-3-(3-acetoxy-4-methoxyphenyl) - alanine·(+)-α-methylbenzylamine was converted to L-dopa as in Example 4 utilizing 48 percent HBr.

EXAMPLE 13

A hot solution of 3.0 g. of D,L-N-acetyl-3,4-methylenedioxyphenylalanine in 25 ml. of acetone was treated with 0.725 g. of (+)-α-methylbenzylamine and allowed to cool to room temperature after being treated with a few seed crystals of the desired salt. After standing at room temperature, L-N-acetyl - 3,4 - methylenedioxyphenylalanine·(+)-α-methylbenzylamine salt were filtered off as crystals.

After freeing the L-N-acetyl-3,4-methylenedioxyphenylalanine from its salt (1.0 g.) as described in Example 4, it was converted to L-dopa by conventional techniques, i.e. heating at reflux with a mixture of red phosphorus (3 g.), conc. HI (7 ml.) and acetic anhydride, (7 ml.) for 3 hrs. and isolated in accordance with conventional procedures.

EXAMPLE 14

A mixture of 2.0 g. of D,L-N-benzoyl-3,4-methylenedioxyphenylalanine and 0.39 g. of (+)-α-methylbenzylamine in 20 ml. of refluxing acetone was treated with a few seed crystals of the desired salt and allowed to cool to room temperature. The precipitated L-N-benzoyl-3,4-methylenedioxyphenylalanine·(+) - α-methylbenzylamine salt was filtered and washed with acetone.

The above salt (2 g.) was decomposed as in Example 4 to give L-N-benzoyl-3,4 - methylenedioxyphenylalanine which was converted to L-dopa by heating with a mixture of red phosphorus conc., HI and acetic anhydride, and then neutralizing in accordance with conventional procedures.

EXAMPLE 15

A mixture of 3.0 g. of D,L-N-formyl-3,4-dimethoxyphenylalanine and 0.72 g. (+)-α-methylbenzylamine in 25 ml. of refluxing acetone was treated with a few seed crystals of the desired salt and allowed to cool to room temperature. The precipitated L-N-formyl-3,4-dimethoxyphenylalanine·(+)-α-methylbenzylamine was filtered and washed with acetone.

The above salt (1 g.) was decomposed to L-N-formyl-3,4-dimethoxyphenylalanine as in Example 4 and this was converted to L-dopa by treatment with refluxing 48 percent HBr also as in Example 4.

EXAMPLE 16

The mother liquors obtained in Example 3 were treated in a conventional way to convert compounds contained therein to the free acid. The resulting medium which is enriched in the D-isomer, namely, D-N-acetyl-3,4-dimethoxyphenylalanine$[\alpha]_D^{25}$ −20° (c.=1, MeOH) was treated with 3 ml. of acetic anhydride and 50 mg. of sodium acetate. After heating at 80° until a clear solution was formed, the hot solution was treated with 15 ml. of water. The pH was adjusted to 2 with concentrated HCl and the resultant medium cooled. The precipitate which formed was separated and found to be the racemate N-acetyl-3,4-dimethoxyphenylalanine monohydrate having a M.P. of 104–106°, $[\alpha]_D^{25}$ —0° (c.=1, MeOH).

I claim:

1. A compound of the formula:

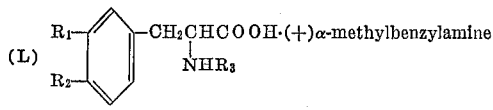

wherein $R_1$ and $R_2$ are individually selected from the group consisting of hydroxy, acetoxy and methoxy; and $R_3$ is benzoyl.

2. A compound as defined in claim 1 of the formula (L)-N-benzoyl-3-(4-hydroxy-3-methoxy) - phenylalanine·(+)-α-methylbenzylamine.

3. A process for resolving into its optical enantiomorphs a racemate of the formula:

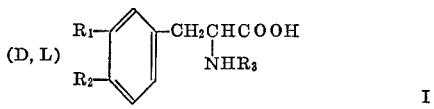

wherein $R_1$ and $R_2$ are individually selected from the group consisting of hydroxy, acetoxy and methoxy; and $R_3$ is benzoyl;

which comprises treating a solution of the racemate in a solvent selected from the group consisting of a lower alkyl ketone, dioxane and formamide with from about 0.4 to about 1.5 moles of (+)-α-methylbenzylamine per mole of said racemate to form a (+)-α-methylbenzylamine salt of the L-enantiomorph and precipitating said salt from said solution by crystallization.

4. A process as defined in claim 3 wherein one of $R_1$ and $R_2$ is hydroxy, and the other is methoxy.

5. A process as defined in claim 3 wherein said racemate is (D,L)-N-benzoyl-3-(4-hydroxy-3-methoxy) - phenylalanine.

References Cited

UNITED STATES PATENTS 3,344,023  9/1967  Reinhold et al. _____ 424—319

FOREIGN PATENTS 6603373  9/1966  Netherlands.

OTHER REFERENCES

Eliel, E. L., Stereochemistry of Carbon Compounds, McGraw-Hill Book Co., Inc., N.Y. (1962), pp. 47–52.

BERNARD HELFIN, Primary Examiner

M. W. GLYNN, Assistant Examiner

U.S. Cl. X.R.

260—340.3, 340.5, 471 A, 479 R, 518 R